(12) United States Patent
Miyashita

(10) Patent No.: US 9,658,380 B2
(45) Date of Patent: May 23, 2017

(54) PLANAR LIGHTING DEVICE

(71) Applicants: CITIZEN ELECTRONICS CO., LTD., Yamanashi-ken (JP); CITIZEN WATCH CO., LTD., Tokyo (JP)

(72) Inventor: Junji Miyashita, Yamanashi-ken (JP)

(73) Assignees: CITIZEN ELECTRONICS CO., LTD., Yamanashi-Ken (JP); CITIZEN WATCH CO., LTD., Tokyo (JP)

( * ) Notice: Subject to any disclaimer, the term of this patent is extended or adjusted under 35 U.S.C. 154(b) by 72 days.

(21) Appl. No.: 14/848,725

(22) Filed: Sep. 9, 2015

(65) Prior Publication Data
US 2016/0070049 A1 Mar. 10, 2016

(30) Foreign Application Priority Data

Sep. 10, 2014 (JP) ................. 2014-184660

(51) Int. Cl.
*F21V 8/00* (2006.01)
(52) U.S. Cl.
CPC ......... *G02B 6/0016* (2013.01); *G02B 6/0018* (2013.01); *G02B 6/0023* (2013.01); *G02B 6/0028* (2013.01); *G02B 6/0021* (2013.01); *G02B 6/0068* (2013.01)
(58) Field of Classification Search
CPC .... G02B 6/0016; G02B 6/0018; G02B 6/002; G02B 6/0021; G02B 6/0023; G02B 6/0028; G02B 6/003; G02B 6/0066; G02B 6/0068; G02B 6/0073
See application file for complete search history.

(56) References Cited

U.S. PATENT DOCUMENTS

| | | | | |
|---|---|---|---|---|
| 5,664,862 A | * | 9/1997 | Redmond | G02B 6/001 362/293 |
| 7,473,022 B2 | * | 1/2009 | Yoo | G02B 6/0021 362/294 |
| 7,798,681 B2 | * | 9/2010 | Wang | F21V 7/09 362/335 |
| 2007/0008739 A1 | | 1/2007 | Kim et al. | |
| 2008/0049168 A1 | | 2/2008 | Kubota | |
| 2008/0151142 A1 | | 6/2008 | Noba | |

(Continued)

FOREIGN PATENT DOCUMENTS

| | | |
|---|---|---|
| JP | 09-167860 | 6/1997 |
| JP | 2004-296372 | 10/2004 |
| JP | 2008-204652 | 9/2008 |

*Primary Examiner* — Alan Cariaso
(74) *Attorney, Agent, or Firm* — Wenderoth, Lind & Ponack, L.L.P.

(57) ABSTRACT

In a first aspect of the present inventive subject matter, a planar light guide device includes light-emitting elements arranged on a surface of a substrate to be an alignment on a center line between two long edges of the surface of the substrate; and a light-transmitting resin including a region in which optical elements are arranged at a first side and a second side of the light-transmitting resin, and the optical element includes a first surface and a second surface that is smaller in area than the first surface, and the first surface of the optical element is inclined with an angle that is in a range of one to 40 degrees with respect to a surface that is perpendicular to the mounting surface of the substrate with an edge of the surface in parallel with the center line between the two long edges of the surface of the substrate.

18 Claims, 16 Drawing Sheets

(56) References Cited

U.S. PATENT DOCUMENTS

| | | |
|---|---|---|
| 2008/0253117 A1 | 10/2008 | Miyashita |
| 2013/0114301 A1 | 5/2013 | Um |
| 2013/0148372 A1 | 6/2013 | Shih et al. |
| 2013/0329429 A1 | 12/2013 | Lowes et al. |

* cited by examiner

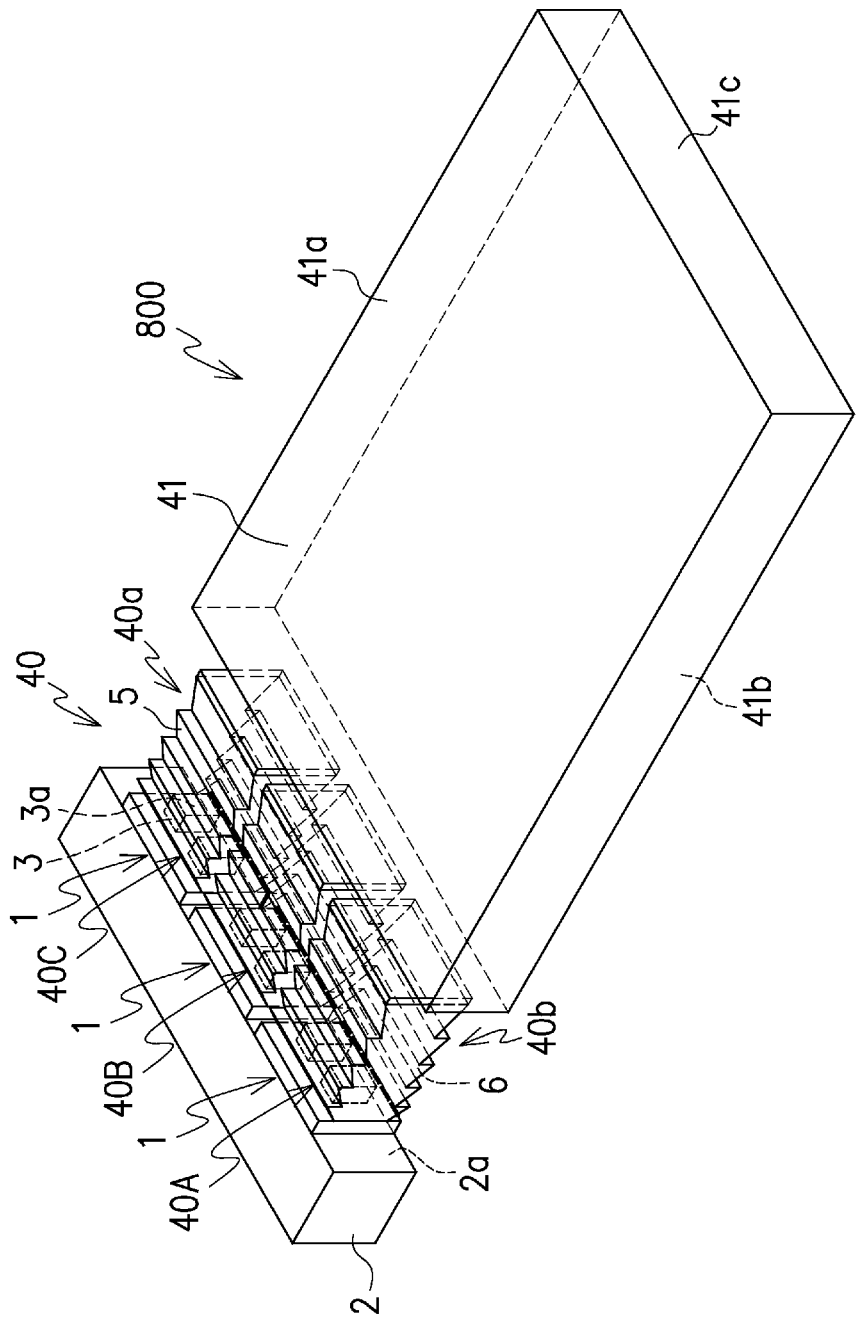

PLANAR LIGHTING DEVICE

CROSS-REFERENCE TO RELATED APPLICATION

This application is a new U.S. patent application that claims benefit of JP2014-184660, filed on Sep. 10, 2014, the disclosures of which are incorporated herein by reference in its entirety.

BACKGROUND OF THE INVENTION

Field of the Invention

The present invention relates to a planar lighting device including a light source that includes a light-emitting element; and a region being adjacent to the light-emitting element and including optical elements; and a light-guiding region being adjacent to the region and including a light-exit surface to emit light from the light-emitting element.

Description of the Related Art

A lighting device including a light-emitting element and a light-guiding portion that seals the light-emitting element is known to the public. For example, it is open to the public that a light guide device for vehicle includes at least one incident portion, a diffusion surface, a reflecting portion, and at least one light source is disposed between the diffusion surface and the reflective portion (For reference, see U.S. Unexamined Patent Application Publication No. US 2013/0148372 A1). Also, it is open to the public that an emitter package includes one or more emitters on a submount, an encapsulant having at least one reflective surface over the emitters and the submount (For reference, see U.S. Unexamined Patent Application Publication No. US 2013/0329429 A1).

Furthermore, it is open to the public that alight source-guide structure of backlight apparatus with LED light source inserted into light guide plate. The LED light source includes a transparent package and an LED chip that is positioned inside the transparent package. The transparent package of the LED light source is inserted in a groove of the light guide plate and adhered to the groove. (For reference, see U.S. Unexamined Patent Application Publication No. US 2007/0008739 A1).

In addition, it is open to the public that a backlight unit includes a light source arranged in a recess of a light guide plate that includes reflective portions (For reference, see U.S. Unexamined Patent Application Publication No. US 2008/0049168 A1).

Furthermore, it is open to the public that a display device includes a light guide plate, alight source disposed on a side surface of the light guide plate, alight conversion member disposed between the light source and the light guide plate through an adhesive member (For reference, see U.S. Unexamined Patent Application Publication No. US 2013/0114301 A1).

Also, it is open to the public that a planar light source includes multi-colored light emitting elements that are optically connected to one edge face of a light guide plate, a reflecting material provided on a first main surface of the light guide plate, and a diffusion film provided on a part of a second main surface of the light guide plate to radiate light from the diffusion film (For reference, see Japanese Unexamined Patent Application Publication No. H09-167860).

Also, it is open to the public that an illuminating unit includes a base; a light guide sheet that includes a main surface and a side surface, and is provided on the base; a light source that is disposed in the vicinity of the side surface of the light guide sheet; and a cover member that is provided so as to cover at least a gap between the light source and the side surface of the light guide sheet to reflect light to the light guide sheet (For reference, see Japanese Unexamined Patent Application Publication No. 2008-204652).

Also, it is open to the public that a backlight for a display device includes a light guide plate including a light-exit surface that faces a display device; a first reflecting sheet being arranged at an opposite side of the light-exit surface; dotted light sources arranged with a space in a length direction of an incident surface that is an end surface of the light guide plate; and a second reflecting sheet to cover the dotted light sources and an adjacent part of the light guide plate to the dotted light sources (For reference, see Japanese Unexamined Patent Application Publication No. 2004-296372).

Furthermore, it is open to the public that a light source unit capable of obtaining white light with reduced color irregularity includes a plurality of light-emitting diodes having different emission spectrum peak wavelengths, and a light mixing member that receives light from the light-emitting diodes through an entrance surface. The light mixing member has anisotropic diffusing elements that diffuse incident light from the light-emitting diodes in a specific plane to effect light mixing (For reference, see U.S. Unexamined Patent Application Publication No. US 2008/0151142 A1).

Also, it is open to the public that an optical member has an entrance bottom surface opposed to LED chips and the entrance bottom surface is configured to receive light from the LED chips, an exit top surface opposite to the entrance bottom surface and the exit top surface is configured to emit the light outside the optical member, and an outer peripheral side surface disposed between the entrance bottom surface and the exit top surface. The outer peripheral side surface has a plurality of circumferentially extending grooves each having a V-shaped sectional configuration. The grooves are set with an angle to totally reflect incident light inwardly in the optical member (For reference, see U.S. Unexamined Patent Application Publication No. US 2008/0253117 A1).

SUMMARY OF THE INVENTION

In an aspect of the present inventive subject matter, a planar light guide device includes a light source that includes a substrate, and light-emitting elements that are electrically connected to the substrate and are arranged on a mounting surface of the substrate to be an alignment on a center line between two long edges of the mounting surface of the substrate; and a light-transmitting resin sealing the light-emitting elements and the mounting surface of the substrate. The light-transmitting resin includes a first side and a second side that is an opposite side of the first side.

The light-emitting elements each includes a light-emitting surface that is positioned in the light-transmitting resin between the first side and the second side of the light-transmitting resin. The first side of the light-transmitting resin includes optical elements that are arranged in a region adjacent to the light-emitting elements, and each of the optical elements includes a first surface and a second surface that is smaller in area than the first surface. The first surface of the optical element is inclined with an angle that may be in a range of one to 40 degrees with respect to a surface that is perpendicular to the mounting surface of the substrate with an edge of the surface in parallel with the center line between the two long edges of the mounting surface of the substrate. The second side of the light-transmitting resin includes optical elements that are arranged in a region adjacent to the light-emitting elements, and each of the optical elements includes a first surface and a second surface that is smaller in area than the first surface. The first surface of the optical element is inclined with an angle that may be in a range of one to 40 degrees with respect to a surface that is perpendicular to the mounting surface of the substrate with an edge of the surface in parallel with the center line between the two long edges of the mounting surface of the substrate.

Also, it is disclosed that the light-transmitting resin may include a light-guiding region adjacent to the region in which the optical elements of the first side and the optical elements of the second side are symmetrically arranged.

Furthermore, it is disclosed that at least one side of the first side and the second side of the light-guiding region of the light-transmitting resin includes a light-exit surface to emit light.

It is also suggested that the region including the optical elements at the first side and the optical elements at the second side and the light-guiding region may be adhered to each other through an adhesive layer.

In addition, it is suggested that the light-guiding region may include a light-guiding plate.

It is also suggested that the optical element of the first side of the light-transmitting resin may be a groove, and the optical element of the second side of the light-transmitting resin may be a groove.

Also, it is suggested that the optical element of the first side of the light-transmitting resin may be a protruding portion, and the optical element of the second side of the light-transmitting resin may be a protruding portion.

Furthermore, it is suggested that a size of the region R in which the optical elements at the first side and the second side of the light-transmitting resin are arranged may be decided by a formula:

$$R \leq \left(\frac{T}{2} + \frac{t}{2}\right)\tan\theta c$$

in a condition that a thickness of the light-transmitting resin at an end of the region R and the thickness that is a direction in parallel with a short edge of the mounting surface of the substrate is T, a width of the light-emitting element and the width that is in parallel with the short edge of the mounting surface of the substrate is t, R is a region in which optical elements are arranged on the first side and the second side of the light-transmitting resin, and θ is an angle formed by a vertical surface V to the surface S that is perpendicular to the mounting surface of the substrate and a line L that connects a lower edge of light-emitting surface of the light-emitting element and the end of the region R of the first side of the light-transmitting resin.

Also, it is suggested that the optical elements at the first side of the light-transmitting resin include a first optical element and a second optical element. The first optical element of the optical elements at the first side of the light-transmitting resin is positioned closer to the light-emitting elements than the second optical element, and the first optical element of the optical elements may be smaller in width than the second optical element of the optical elements.

Furthermore, it is suggested that the optical elements at the second side of the light-transmitting resin include a first optical element and a second optical element. The first optical element of the optical elements at the second side of the light-transmitting resin is positioned closer to the light-emitting elements than the second optical element, and the first optical element of the optical elements may be smaller in width than the second optical element of the optical elements.

It is suggested that the width of the optical element in the region at the first side of the light-transmitting resin may be configured to be wider, with an increasing distance from the light-emitting elements.

Also, it is suggested that the width of the optical element in the region at the second side of the light-transmitting resin may be configured to be wider, with an increasing distance from the light-emitting elements.

It is suggested that in the region at the first side of the light-transmitting resin, the first surface of the first optical element may be smaller in area than the first surface of the second optical element.

Also, it is suggested that in the region at the first side of the light-transmitting resin, the first surface of the first optical element in the region at the second side of the light-transmitting region may be smaller in area than the first surface of the second optical element.

It is suggested that the first surface of the optical element may have a rectangular shape.

Also, it is suggested that the first surface of the optical element may have a triangular shape.

In another aspect of the present inventive subject matter, it is suggested that the optical element of the first side of the light-transmitting resin may have a shape of four-sided pyramid with the first surface larger in area than the second surface, and the optical element of the second side of the light-transmitting resin may have a shape of four-sided pyramid with the first surface larger in area than the second surface.

Also, it is suggested that the first surface of the optical element at the first side of the light-transmitting resin may be inclined with an angle in a range of five to 20 degrees with respect to a surface that is perpendicular to the mounting surface of the substrate with an edge of the surface S in parallel with the center line between the two long edges of the mounting surface of the substrate, and the first surface of the optical element at the second side of the light-transmitting resin may be inclined with an angle in a range of five to 20 degrees with respect to a surface that is perpendicular to the mounting surface of the substrate with an edge of the surface in parallel with the center line between the two long edges of the mounting surface of the substrate.

Figure 4:
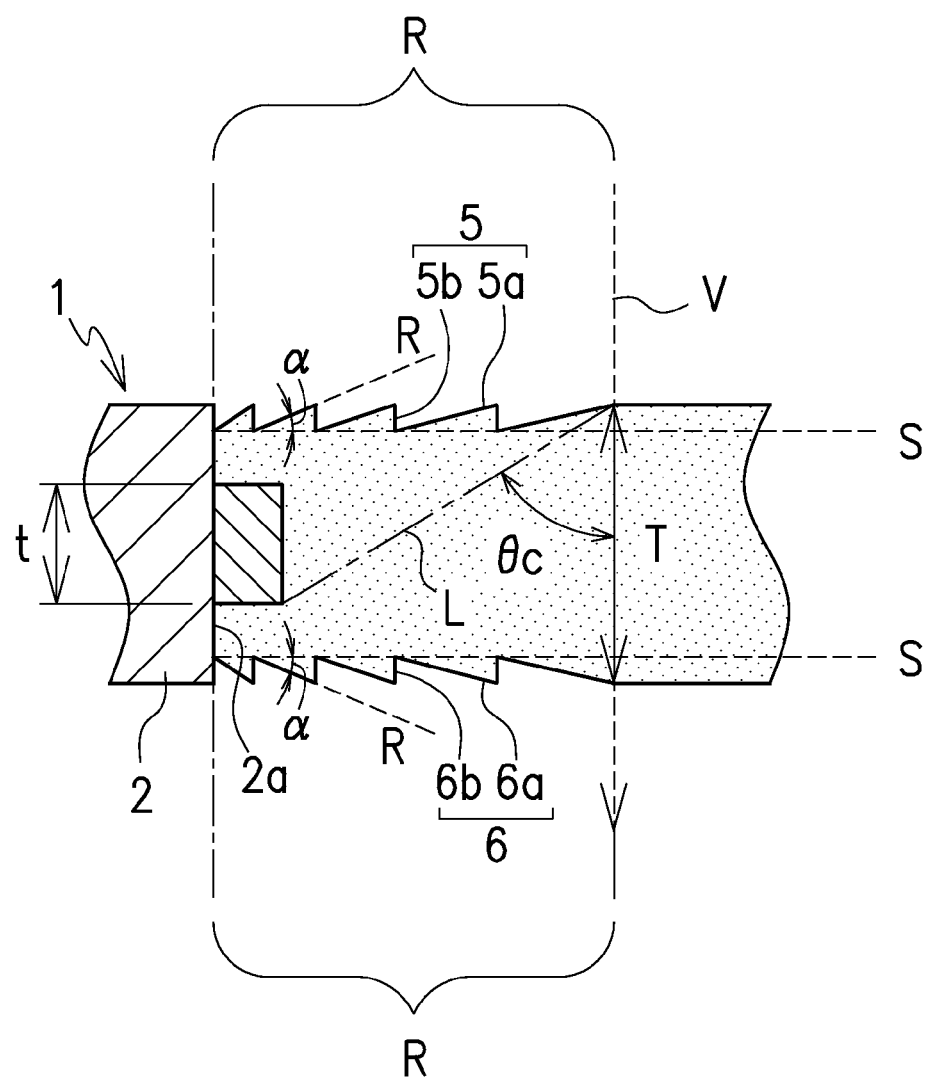

FIG. 4 shows signs used herein with explanations in the specifications.

Figure 5A:
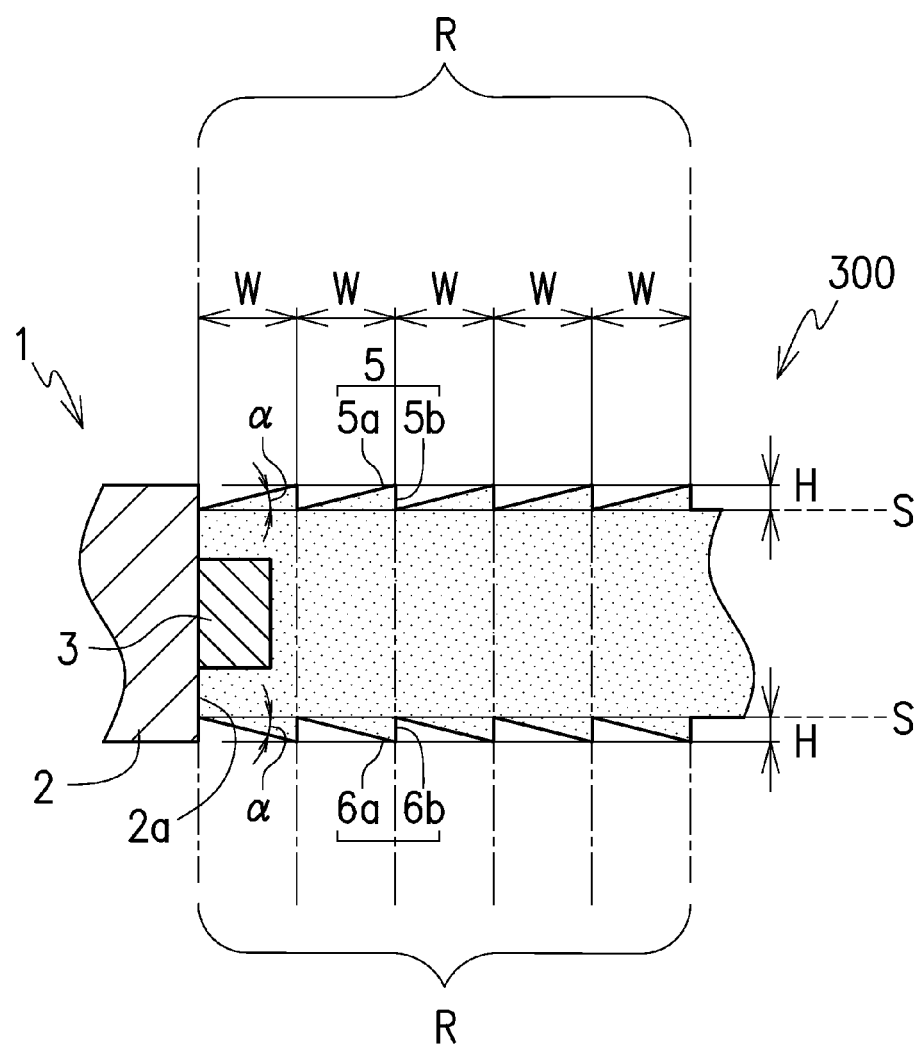

FIG. 5A shows a part of planar lighting device according to a third embodiment of the present invention. The lighting device includes optical elements in a region, and a width of the optical element is constant, and a height of the optical element is constant.

Figure 5B:
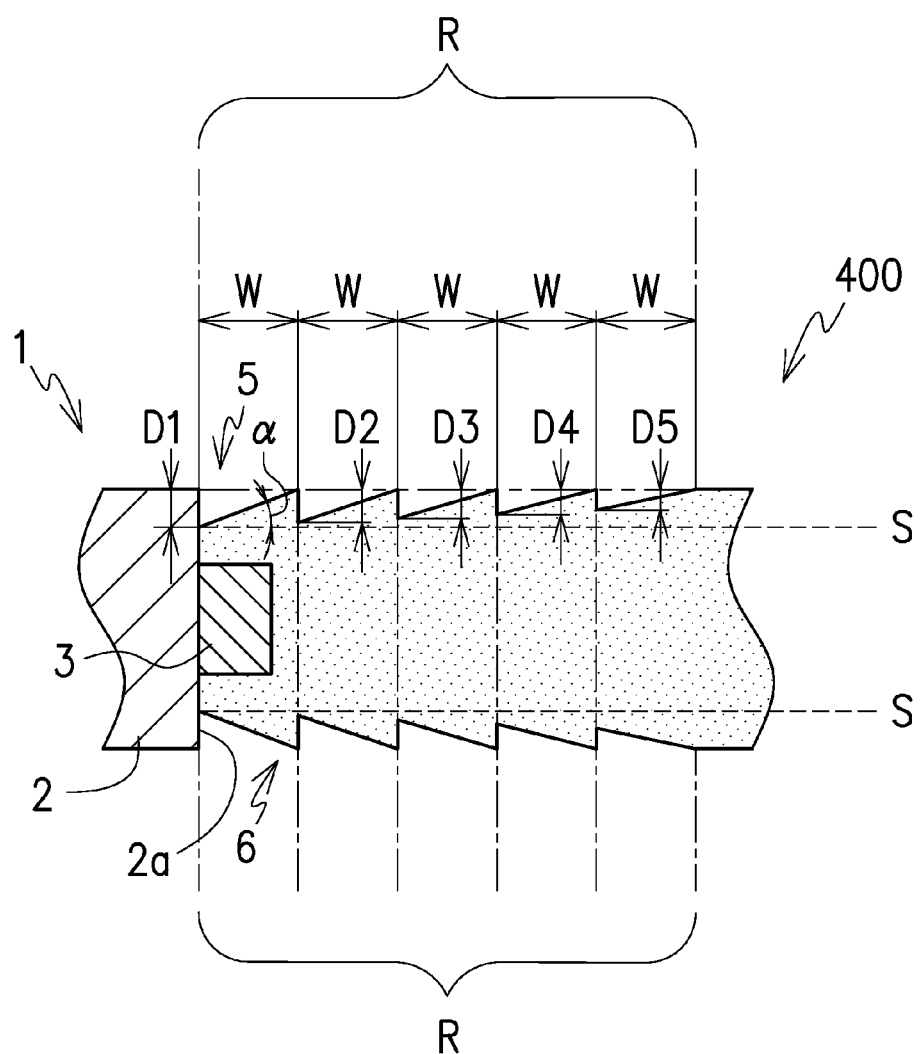

FIG. 5B shows a part of planar lighting device according to a fourth embodiment of the present invention. The lighting device includes optical elements in a region, and a width of the optical element is constant, and a depth of the optical element is arranged to be shallower with an increasing distance from the mounting surface of the substrate.

Figure 5C:
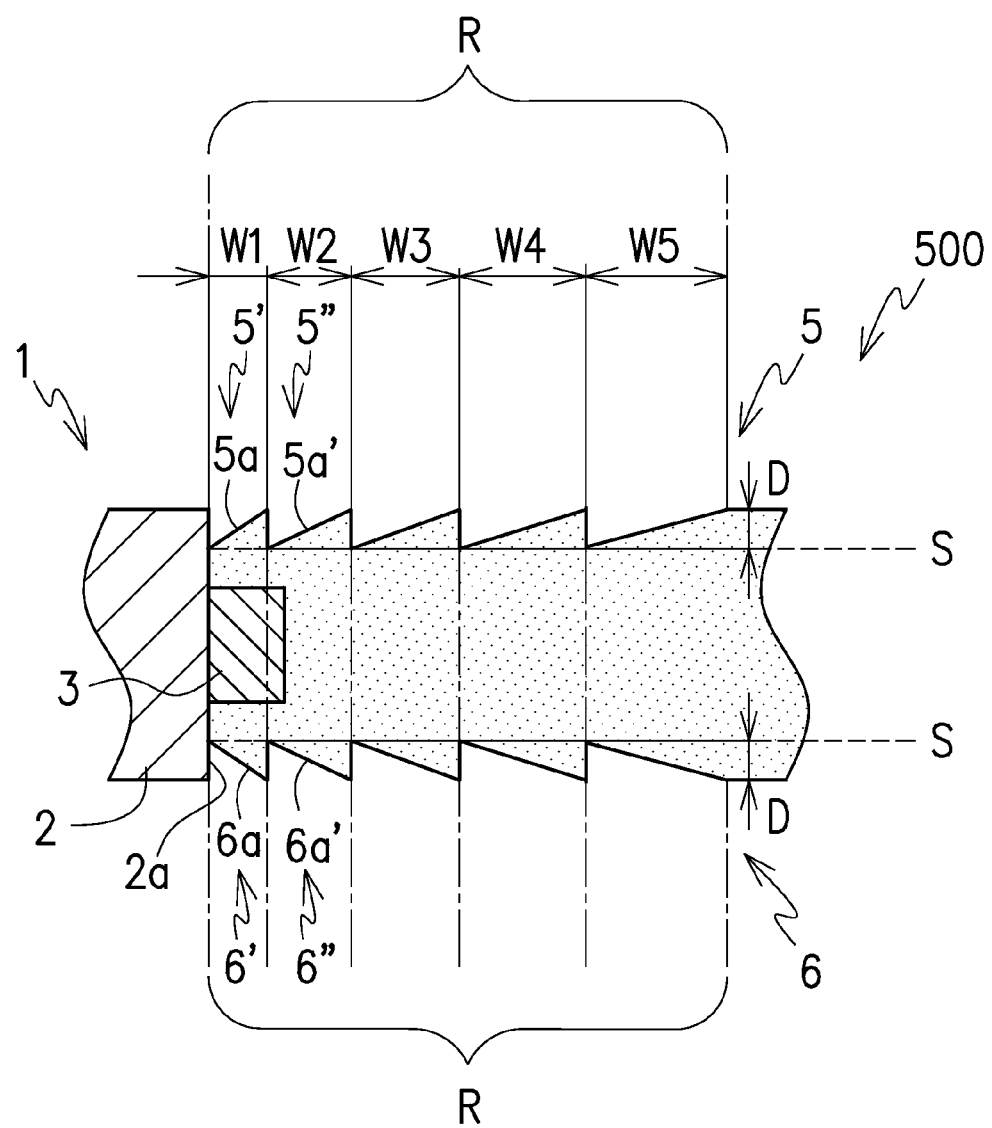

FIG. 5C shows a part of planar lighting device according to a fifth embodiment of the present invention. The planar lighting device includes optical elements in a region. The depth of the optical element is constant, and the width of the optical element is arranged to be wider with an increasing distance from the mounting surface of the substrate.

Figure 5D:
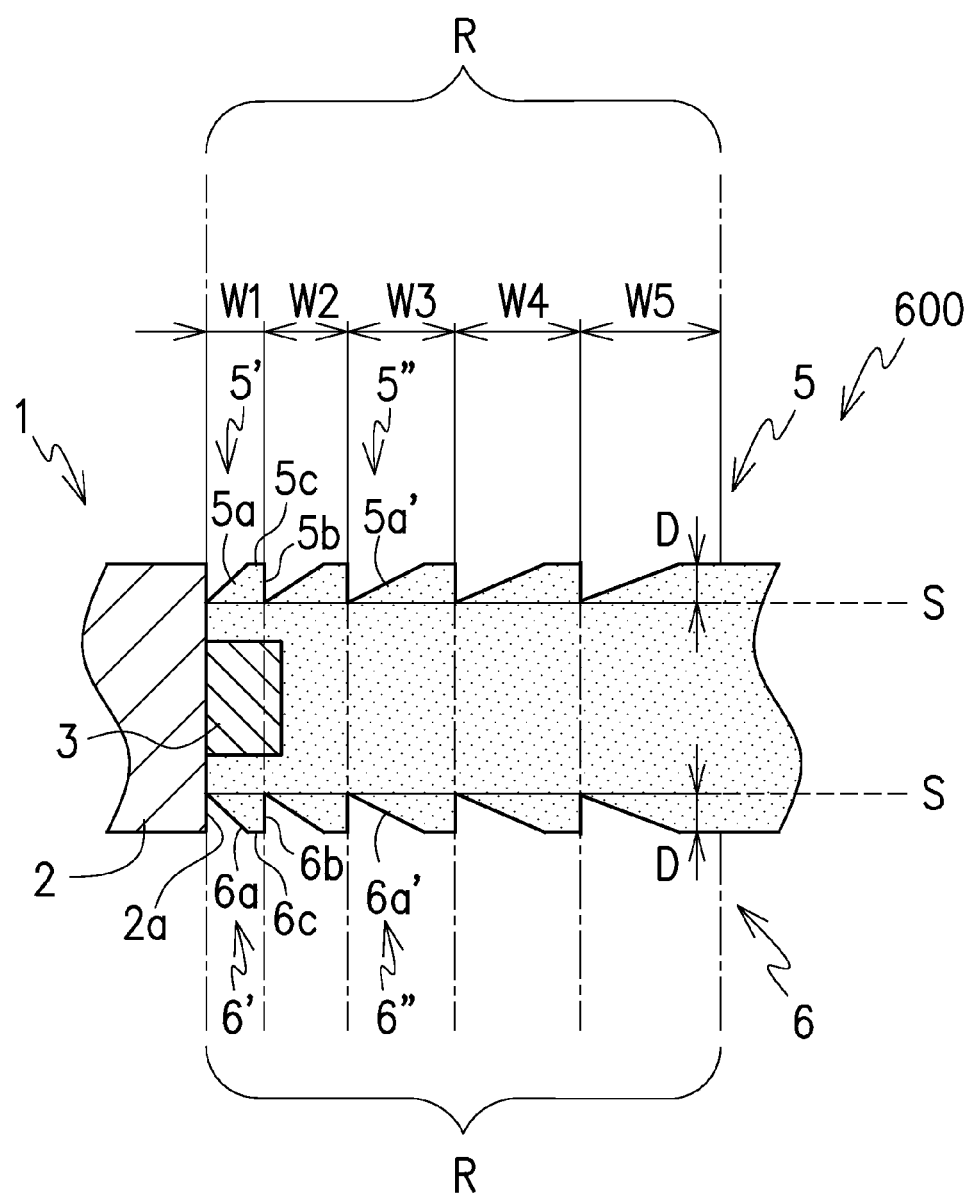

FIG. 5D shows a part of planar lighting device according to a sixth embodiment of the present invention. The planar lighting device includes optical elements in a region. In this embodiment, the optical element includes a first surface, a second surface that is larger in area than the first surface, and a third surface that is flat between the first surface and the second surface. The height of the optical element is constant, and the width is arranged to be wider with an increasing distance from the mounting surface of the substrate.

Figure 6A:
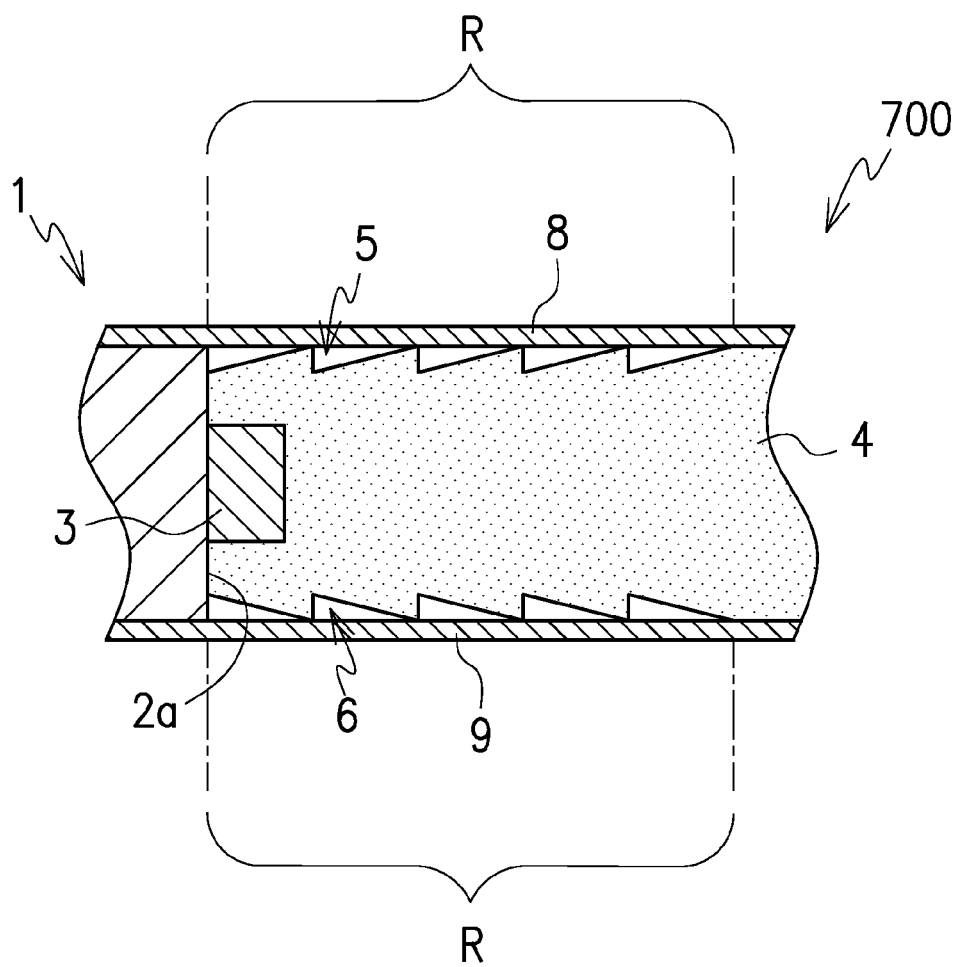

FIG. 6A shows a part of planar lighting device according to a seventh embodiment of the present invention.

Figure 6B:
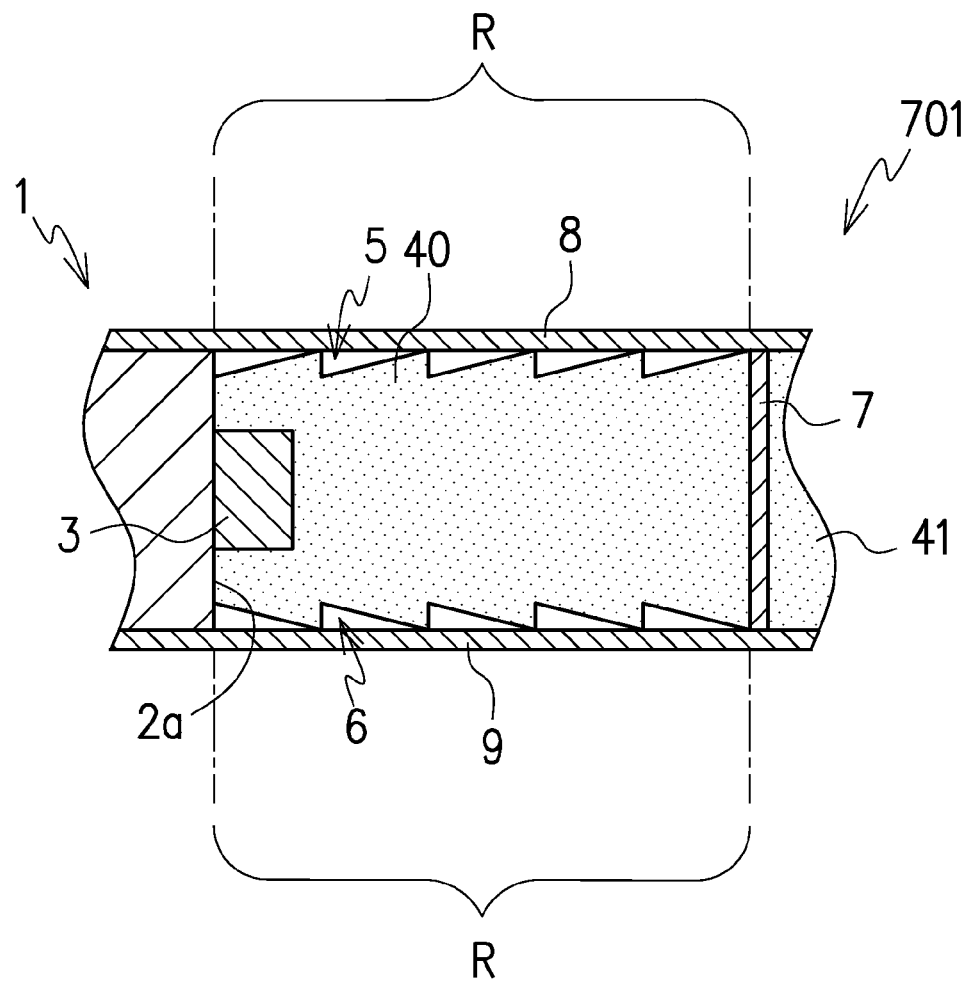

FIG. 6B shows a part of planar lighting device according to an eighth embodiment of the present invention.

FIG. 7 is a perspective view from above, of planar lighting device according to a ninth embodiment of the present invention.

Figure 8A:
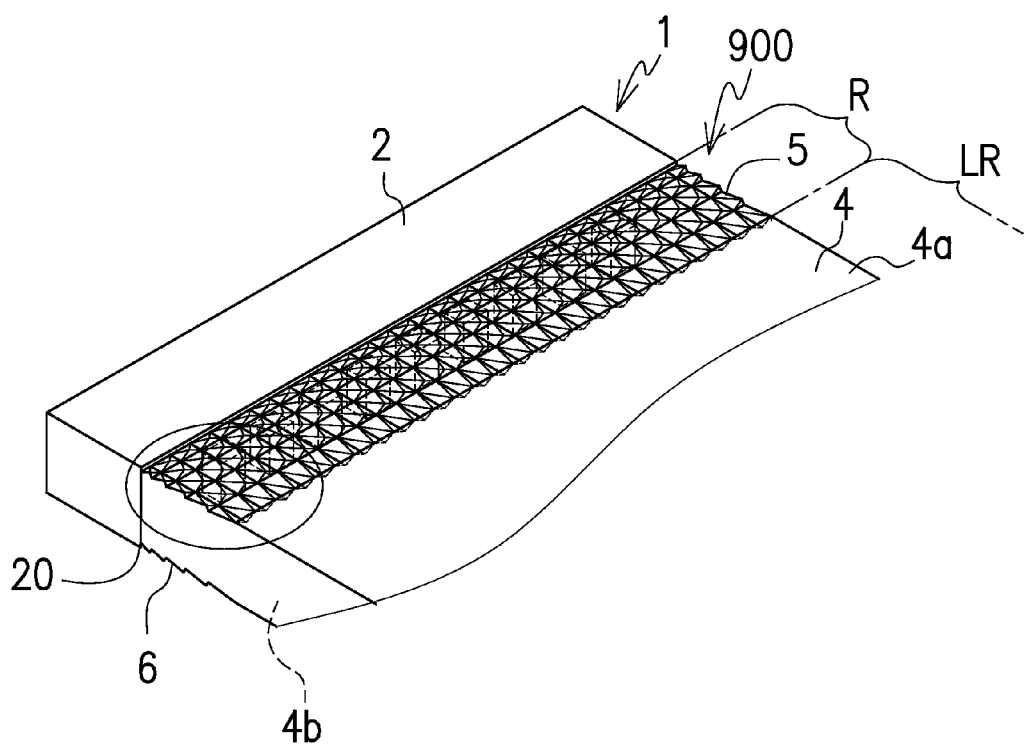

FIG. 8A shows a part of planar lighting device according to a tenth embodiment of the present invention.

Figure 8B:
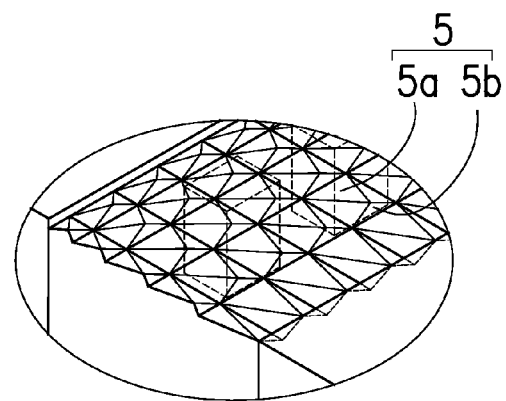

FIG. 8B is an enlarged view in a circle shown in FIG. 8A, showing optical elements at a first side of a light-transmitting resin.

DETAILED DESCRIPTION OF THE EMBODIMENTS

As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "contains", "containing", "has" and/or "having" when used herein, specify the presence of stated features, integers, elements, components, portion of an element, and/or groups but do not preclude the presence or addition of one or more other features, integers, elements, components, portions, and/or groups thereof.

Relative terms such as "above" or "below" or "top" or "bottom" or "upper" or "uppermost" or "lower" or "upward" or "downward" or "left" or "right" or "front" or "rear" may be used herein to describe a relationship of one element, portion, surface, area, or direction to another element, portion, surface, area, or direction as illustrated in the figures. It will be understood that these terms are intended to encompass different orientations of a device in addition to the orientation depicted in the figures.

Embodiments of the invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Embodiments of the invention are described with reference to drawings included herewith. Same and/or similar reference numbers refer to same and/or similar and/or corresponding and/or related structures throughout. It should be noted that the drawings are schematic in nature.

Figure 1A:
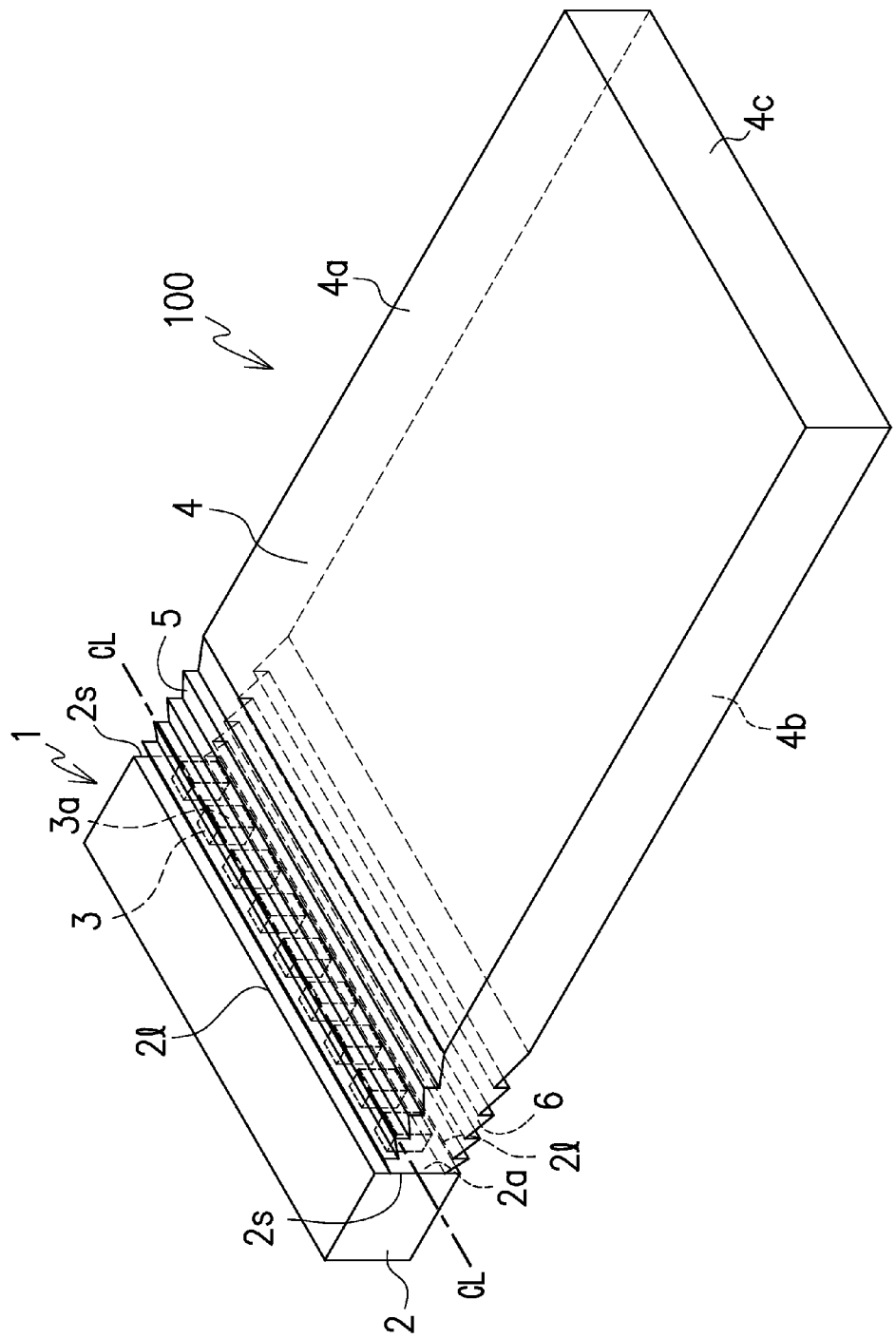
FIG. 1A is a perspective view from above, of planar lighting device according to a first embodiment of the present invention.
Figure 1B:
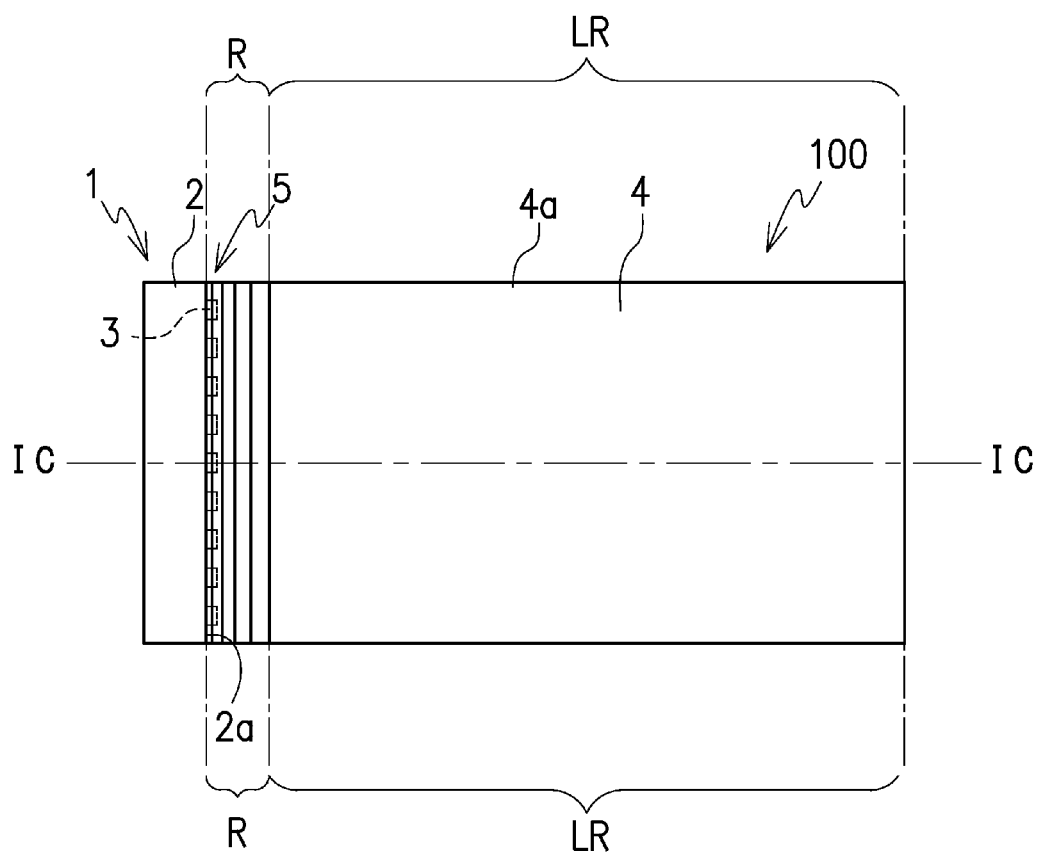
FIG. 1B is a top plan view of planar lighting device shown in FIG. 1A.
Figure 1C:
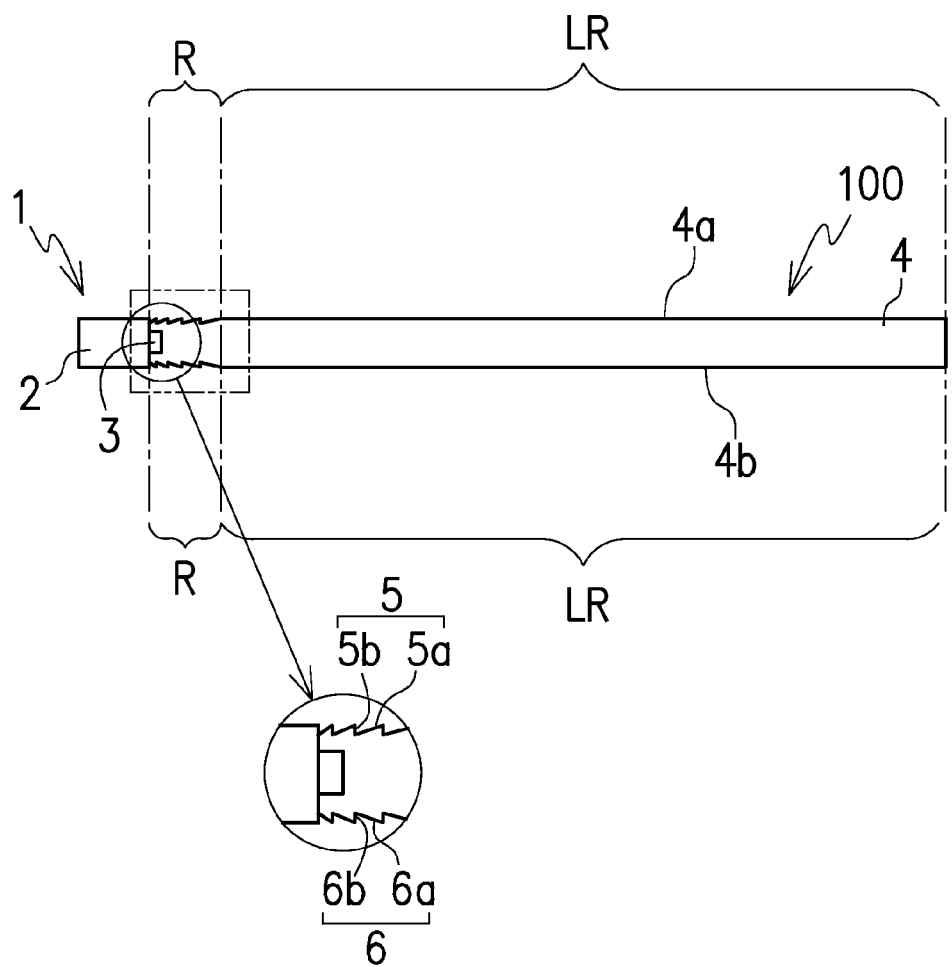
FIG. 1C is a cross sectional view of planar lighting device taken along a line IC-IC shown in FIG. 1B.

FIG. 1A is a perspective view from above, of planar lighting device according to a first embodiment of the present invention. FIG. 1B is a top plan view of planar lighting device 100 shown in FIG. 1A. FIG. 1C is a cross sectional view of planar lighting device taken along a line 1C-1C shown in FIG. 1B.

A planar light guide device 100 includes a light source 1 including a substrate 2, and light-emitting elements 3 that are electrically connected to the substrate 2. The light-emitting elements 3 are arranged on a mounting surface 2a of the substrate 2 to be an alignment on a center line CL between two long edges 21 of the mounting surface 2a of the substrate 2.

The planar light guide device 100 further includes a light-transmitting resin 4 sealing the light-emitting elements 3 and the mounting surface 2a of the substrate 2. The light-transmitting resin 4 includes a first side 4a and a second side 4b that is an opposite side of the first side 4a. Also, the light-transmitting resin 4 includes a peripheral side surface 4c that is positioned between edges of the first side 4a and edges of the second side 4b of the light-transmitting resin 4. The peripheral side surface 4c includes four sides, one of which is a surface on the mounting surface 2a of the substrate 2.

The light-emitting elements 3 each includes a light-emitting surface 3a that is positioned in the light-transmitting resin 4 between the first side 4a and the second side 4b of the light-transmitting resin 4.

The first side 4a of the light-transmitting resin 4 includes optical elements 5 that are arranged in a region R adjacent to the light-emitting elements 3. Each of the optical elements 5 includes a first surface 5a and a second surface 5b that is smaller in area than the first surface 5a. The first surface 5a of the optical element 5 is inclined with an angle α that is in a range of one to 40 degrees with respect to a surface S that is perpendicular to the mounting surface 2a of the substrate 2.

The surface S is a reference surface and imaginary surface to measure the angle α. The surface S is perpendicular to the mounting surface 2a of the substrate 2 with an edge of the surface S in parallel with the center line CL between the two long edges 21 of the mounting surface 2a of the substrate 2.

The second side 4b of the light-transmitting resin 4 includes optical elements 6 that are arranged in a region R adjacent to the light-emitting elements 3. Each of the optical elements 6 includes a first surface 6a and a second surface 6b that is smaller in area than the first surface 6a. The first surface 6a of the optical element 6 is inclined with an angle α that is in a range of one to 40 degrees with respect to a surface S that is perpendicular to the mounting surface 2a of the substrate 2.

The surface S is, as previously mentioned, a reference surface and imaginary surface to measure the angle α. The surface S is perpendicular to the mounting surface 2a of the substrate 2 with an edge of the surface S in parallel with the center line CL between the two long edges 21 of the mounting surface 2a of the substrate 2.

Also, the light-transmitting resin 4 further includes a light-guiding region LR adjacent to the region R in which the optical elements 5 of the first side 4a and the optical elements 6 of the second side 4b are symmetrically arranged as shown in FIG. 1C.

In this embodiment, the first surface 5a (6a) of the optical element 5(6) has a rectangular shape, which is in parallel with the two long edges 21 of the mounting surface 2a of the substrate 2.

In the cross sectional view of planar lighting device 100 shown in FIG. 1C, a cross sectional view of the optical element 5(6) has a triangular shape with the first surface 5a(6a) and the second surface 5b(6b).

Furthermore, at least one side of the first side 4a and the second side 4b of the light-guiding region LR of the light-transmitting resin 4 includes a light-exit surface to emit light. Of course, it is possible that the first side 4a may include a light-exit surface to emit light, and the second side 4b may also include a light-exit surface to emit light, depending on a requirement.

In the planar light guide device 100, the optical element 5 of the first side 4a of the light-transmitting resin 4 may be a groove into the first side 4a of the light-transmitting resin 4. The optical element 6 of the second side 4b of the light-transmitting resin 4 may be a groove into the second side 4b of the light-transmitting resin 4.

The light-transmitting resin 4 includes the light-guiding region LR adjacent to the region R in which the optical elements 5 of the first side 4a and the optical elements 6 of the second side 4b are symmetrically arranged.

The mounting surface 2a of the substrate 2 may have a rectangular shape with two long edges 21 and two short edges 2s that are shorter than the two long edges 21. The center line CL extends along the two long edges 21 of the mounting surface 2a of the substrate 2. The substrate 2 may include at least one pair of electrodes (not shown in Figures herein). The light-emitting elements 3 may be electrically connected to the at least one pair of electrodes by metallic wires, for example.

Also, it is possible that the light-emitting elements 3 may be electrically connected through bumps. The substrate may include a light-reflecting surface adjacent to the light-emitting elements 3. The substrate 2 may be a ceramic substrate. Also, the substrate may include a metallic layer to which the light-emitting elements 3 are thermally connected and include an electrically-insulation layer that is arranged on a surface of the metallic layer and includes at least one pair of electrodes.

The light source 1 may include light-emitting elements 3 with a same and/or similar wavelength peak range of light. The wavelength peak range of light may include a wavelength of 400 nm, for example. The wavelength peak range of light may include a wavelength of 450 nm. Furthermore, it is possible to combine one or more phosphors with a wavelength peak range of light among 500-700 nm to obtain a required color of light, for example, white color of light.

Also, it is possible that the light source 1 may include light-emitting elements 3 with a different wavelength peak range of light. For example, the light source 1 may include a light-emitting element 3 that is able to emit red light, a light-emitting element 3 that is able to emit green light, and a light-emitting element 3 that is able to emit blue light, when an electrical current is applied to the light source 1.

The red light-emitting elements, the green light-emitting elements and the blue light-emitting elements may be arranged in this order, and RGB (red-green-blue) rays of colored light are configured to be mixed in the region R by the optical elements 5 at the first side 4a and by the optical elements 6 at the second side 4b of the light-transmitting resin 4 to appear to be a required color of light, for example, white color of light.

Figure 2A:
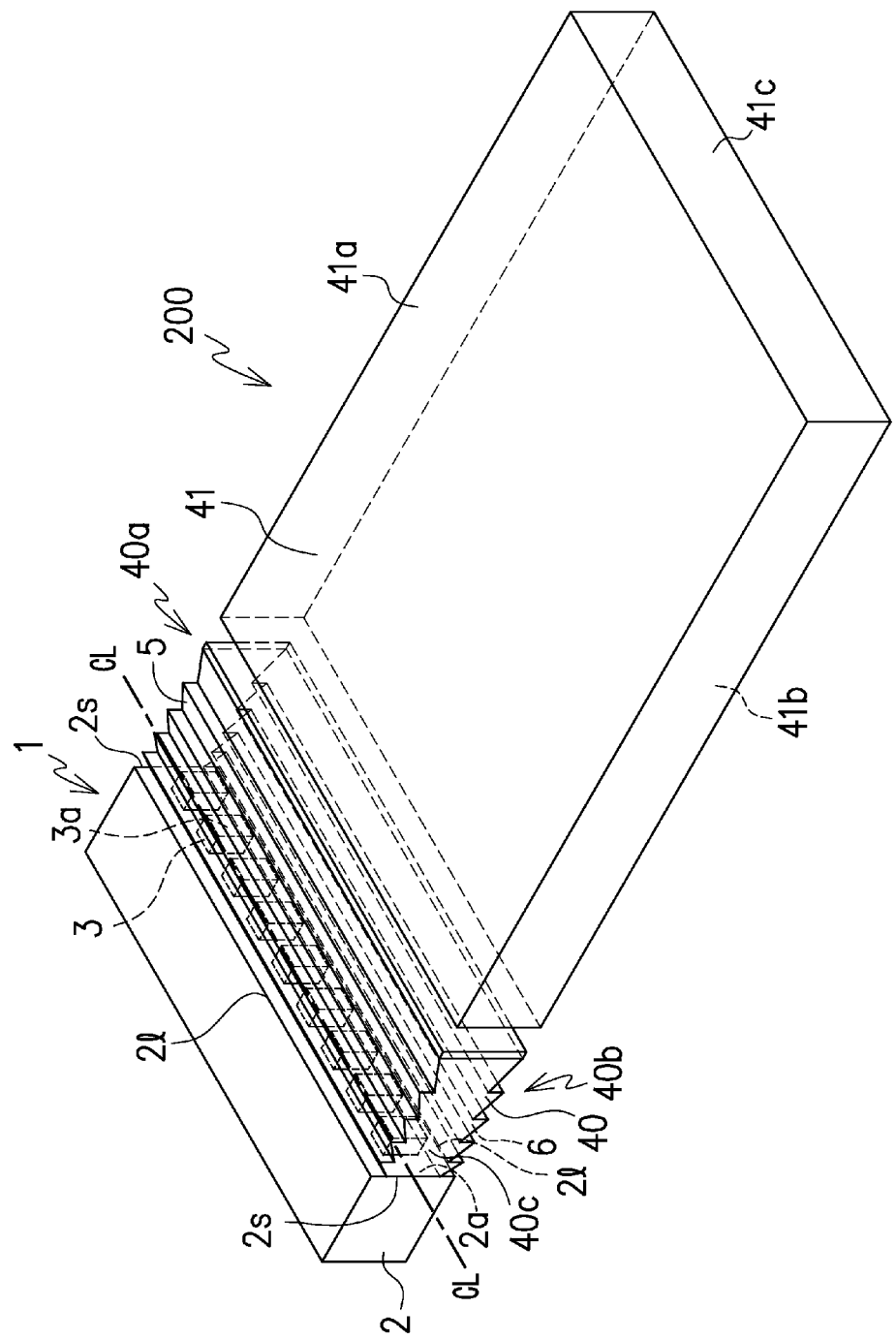
FIG. 2A is a perspective view from above, of planar lighting device according to a second embodiment of the present invention.
Figure 2B:
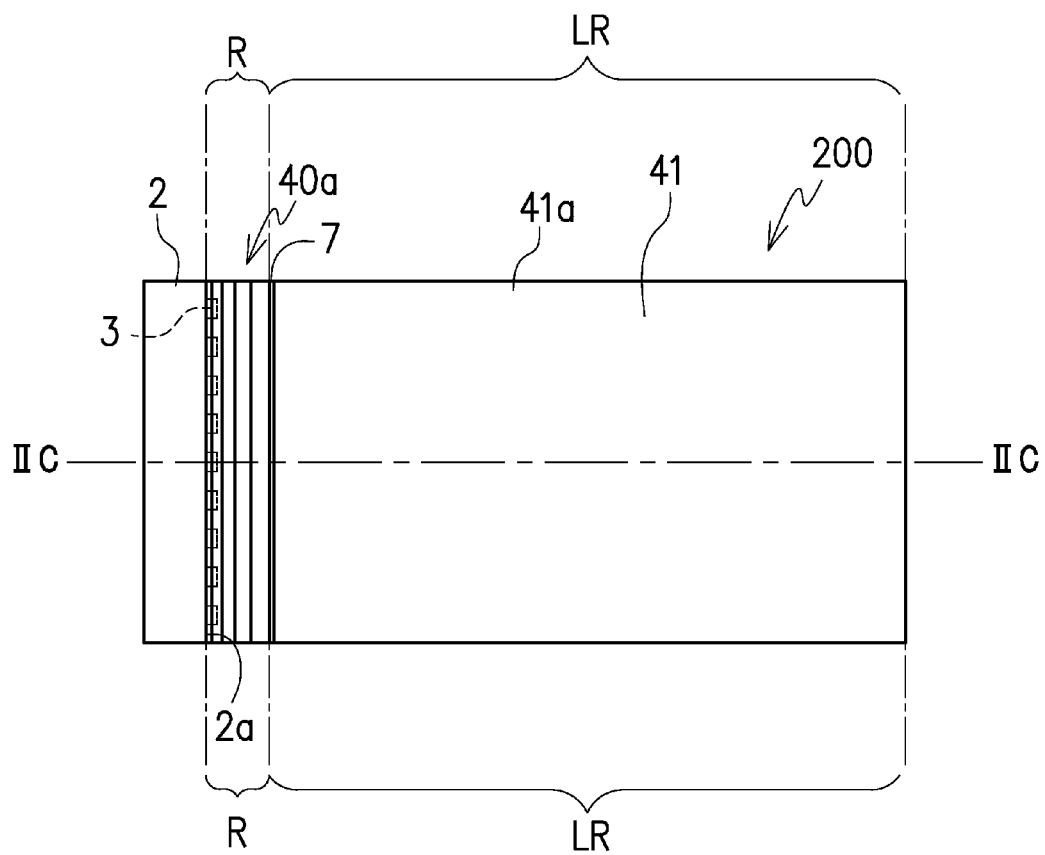
FIG. 2B is a top plan view of planar lighting device shown in FIG. 2A.
Figure 2C:
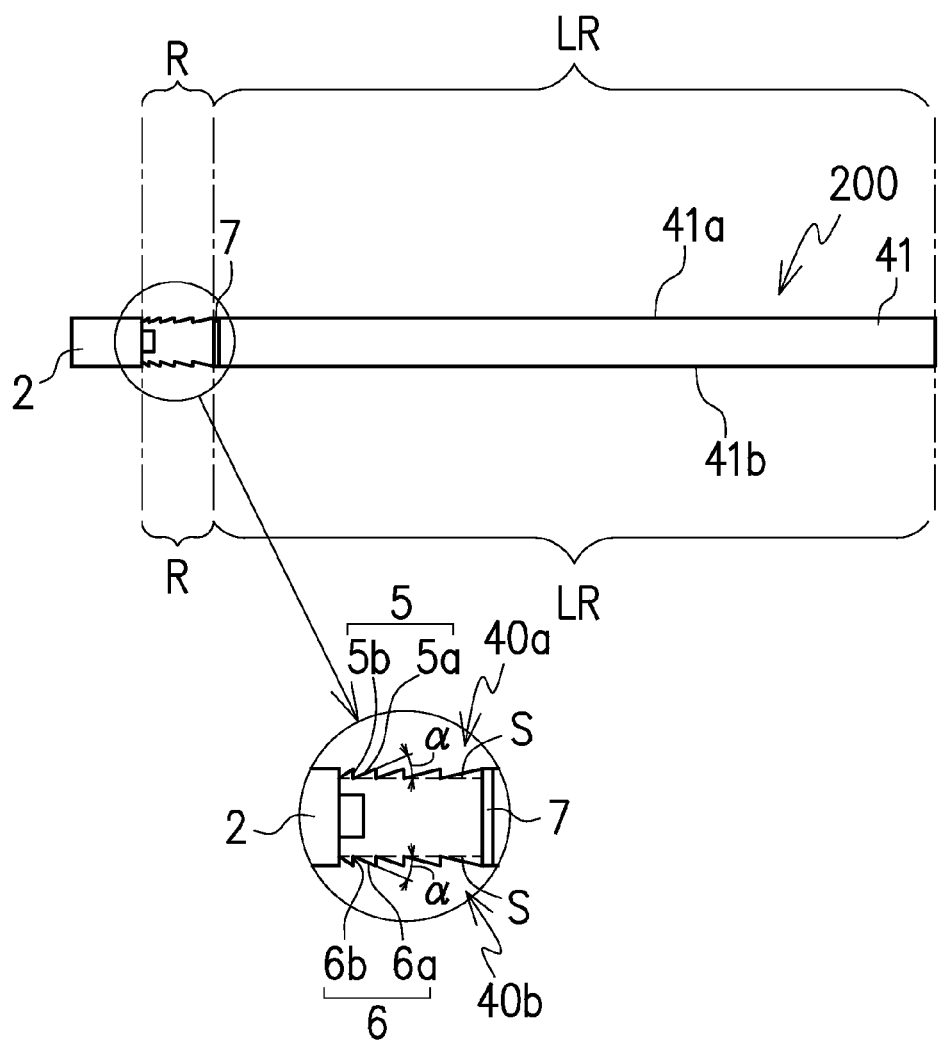
FIG. 2C is a cross sectional view of planar lighting device taken along a line IIC-IIC shown in FIG. 2B.

FIG. 2A is a perspective view from above, of planar lighting device 200 according to a second embodiment of the present invention. FIG. 2B is a top plan view of planar lighting device shown in FIG. 2A. FIG. 2C is a cross sectional view of planar lighting device taken along a line IIC-IIC shown in FIG. 2B.

A planar light guide device 200 includes a light source 1 including a substrate 2, and light-emitting elements 3 that are electrically connected to the substrate 2. The light-emitting elements 3 are arranged on a mounting surface 2a of the substrate 2 to be an alignment on a center line CL between two long edges 21 of the mounting surface 2a of the substrate 2.

The planar light guide device 200 further includes a light-transmitting resin 40 sealing the light-emitting elements 3 and the mounting surface 2a of the substrate 2. The light-transmitting resin 40 includes a first side 40a and a second side 40b that is an opposite side of the first side 40a.

The light-emitting elements 3 each includes a light-emitting surface 3a that is positioned in the light-transmitting resin 40 between the first side 40a and the second side 40b of the light-transmitting resin 40.

The first side 40a of the light-transmitting resin 40 includes optical elements 5 that are arranged in a region R adjacent to the light-emitting elements 3. Each of the optical elements 5 includes a first surface 5a and a second surface 5b that is smaller in area than the first surface 5a. The first surface 5a of the optical element 5 is inclined with an angle α that is in a range of one to 40 degrees with respect to a surface S that is perpendicular to the mounting surface 2a of the substrate 2.

The surface S is a reference surface and imaginary surface to measure the angle α. The surface S is perpendicular to the mounting surface 2a of the substrate 2 with an edge of the surface S in parallel with the center line CL between the two long edges 21 of the mounting surface 2a of the substrate 2.

The second side 40b of the light-transmitting resin 40 includes optical elements 6 that are arranged in the region R adjacent to the light-emitting elements 3. Each of the optical elements 6 includes a first surface 6a and a second surface 6b that is smaller in area than the first surface 6a. The first surface 6a of the optical element 6 is inclined with an angle α that is in a range of one to 40 degrees with respect to a surface S that is perpendicular to the mounting surface 2a of the substrate 2. The mounting surface 2a of the substrate 2 is a side where the light-emitting elements 3 are mounted.

The surface S is a reference surface and imaginary surface to measure the angle α. The surface S is perpendicular to the mounting surface 2a of the substrate 2 with an edge of the surface S in parallel with the center line CL between the two long edges 21 of the mounting surface 2a of the substrate 2.

In this embodiment, the first surface 5a (6a) of the optical element 5(6) has a rectangular shape, which is in parallel with the two long edges 21 of the mounting surface 2a of the substrate 2.

In the cross sectional view of planar lighting device 200 shown in FIG. 2C, a cross sectional view of the optical element 5(6) has a triangular shape.

Different from the planar light guide device 100 according to the first embodiment, in the planar light guide device 200 according to the second embodiment, the region R including optical elements 5(6) and the light-guiding region LR are adhered by an adhesive layer 7. The region R including the optical elements 5(6) of a light-transmitting resin 40 is able to be separately prepared from the light-guiding region LR. The light-transmitting resin 40 includes a peripheral side surface 40c that is positioned between edges of the first side 40a and edges of the second side 40b of the light-transmitting resin 40. The peripheral side surface 40c includes four sides, one of which is on the mounting surface 2a of the substrate 2.

The light-emitting elements 3 each includes a light-emitting surface 3a that is positioned in the light-transmitting resin 40 between the first side 40a and the second side 40b of the light-transmitting resin 40.

The optical elements 5 at the first side 40a and the optical elements 6 of the second side 40b are symmetrically arranged in the region R.

Also, in the planar light guide device 200 the light-guiding region LR may be a light-guiding plate 41 which includes a first side 41a and a second side 41b that is an opposite side of the first side 41a, and a peripheral side surface 41c that is positioned between edges of the first side 41a and edges of the second side 41b of the light-guiding plate 41. The peripheral side surface 41c includes four sides. The adhesive layer 7 may be arranged between one side of the four sides of the peripheral side surface 41c of the light-guiding plate 41 and one side of four sides of peripheral side surface 40c of the light-transmitting resin 40. The one side of the four sides of the peripheral side surface 40c of the light-transmitting resin 40 here is positioned to face the light-emitting surfaces 3a of the light-emitting elements 3 and the mounting surface 2a of the substrate.

The region R with optical elements 5, 6 is able to be prepared separately from the light-guiding region LR. Accordingly, the optical elements 5, 6 in the region R, and/or the light-guiding region LR may be more flexibly prepared. The light-guiding region LR may also include optical elements such as prisms, lenticular lenses, grooves, concave shapes and/or convex shapes etc. to emit light in a required direction. The required direction differs depending on an object to be illuminated. The required direction may include two or more directions.

Accordingly, it would be more convenient, if the region R with optical elements 5, 6 to efficiently utilize light emitted from the light-emitting elements 3 toward the light-guiding region LR, and the light-guiding region LR with optical elements that may be required to emit guided light in one or more required directions from a light-exit surface are able to be separately prepared, though it depends on a condition.

When the region R and the light-guiding region LR are separately prepared and adhered later, it is preferable that the adhesive layer 7 has a refractive index that is similar to a refractive index of the light-transmitting resin. It is more preferable that the adhesive layer 7 and the region R with optical elements 5, 6 and the light-guiding region LR are made of a same material.

In the planar light guide device 200, the optical element 5 of the first side 40a of the light-transmitting resin 40 may be a groove into the first side 40a of the light-transmitting resin 40. The optical element 6 of the second side 40b of the light-transmitting resin 40 may be a groove into the second side 40b of the light-transmitting resin 40.

Figure 3:
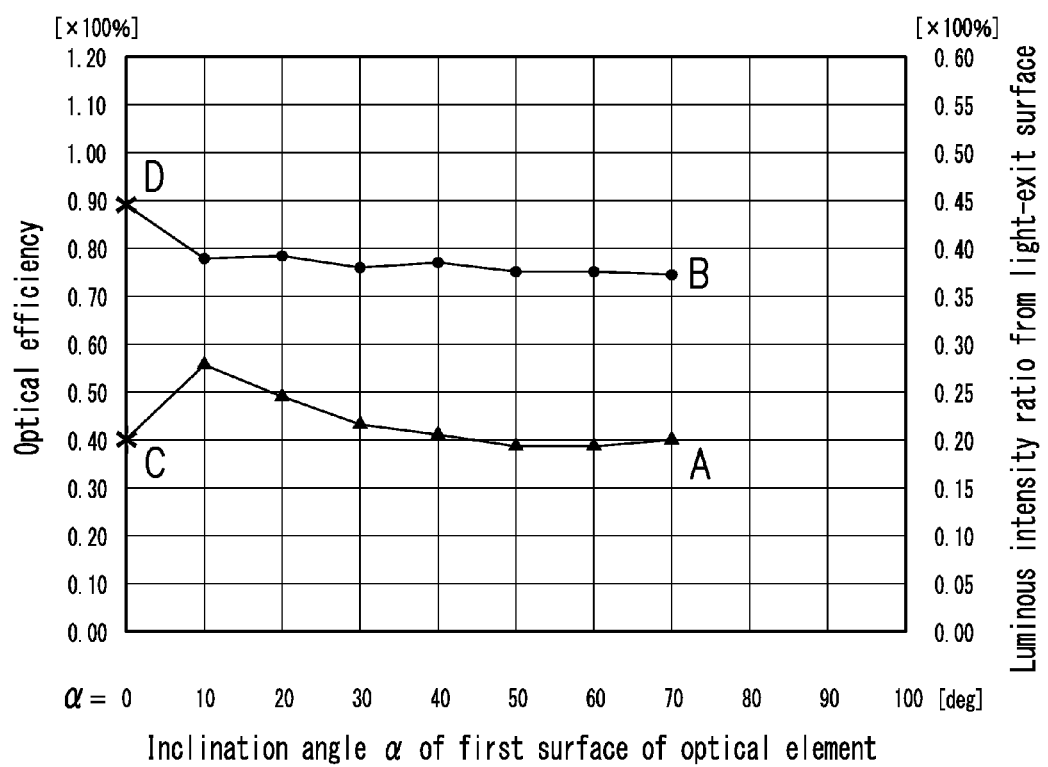
FIG. 3 shows a relationship of a first surface of an optical element that is inclined with an angle α in a range of 0 to 70 degrees with respect to a surface that is perpendicular to the mounting surface of the substrate and a luminous intensity ratio from a light-exit surface as the line graph A, and an optical efficiency as the line graph B.

FIG. 3 shows a relationship of a first surface 5a (6a) of an optical element 5(6) in which the first surface 5a (6a) of the optical element 5(6) is inclined with an angle α in a range of 0 to 70 degrees with respect to a surface S and a luminous intensity ratio from a light-exit surface shown as the line graph A, and an optical efficiency shown as the line graph B. The surface S is a reference surface and imaginary surface to measure the angle α. The surface S is perpendicular to the mounting surface 2a of the substrate 2 with an edge of the surface S in parallel with the center line CL between the two long edges 21 of the mounting surface 2a of the substrate 2.

This shows the relationship when an embodiment of planar light-guiding device with optical elements 5(6) each including a first surface 5a(6a) with the angle α that is constant. However, in an embodiment of planar light-guiding device with optical elements 5(6) each including a first surface 5a(6a) with the angle α in a range of one to 40 degrees being smaller with an increasing distance from the light-emitting elements 3, it is possible to efficiently utilize light emitted from the light-emitting elements 3 toward the light-guiding region LR compared to a condition without optical elements 5, 6, that means "flat" at the first side 4a(40a) and the second side 4b(40b) of the light-transmitting resin 4(40) in the region R.

For more details, the line graph A shows luminous intensity ratio from the light-exit surface of the light-guiding region LR when the angle α is in a range of zero to 70 degrees. The line graph A shows that when the angle α is in a range of one to 40 degrees, luminous intensity ratio from the light-exit surface of the light-guiding region LR is improved compared with the condition that the angle α is zero (0) degree at the sign C in FIG. 3. Also, when the angle α is in a range of five to 20 degrees, the luminous intensity ratio from the light-exit surface of the light-guiding region LR becomes preferably improved.

The line graph B shows that when the angle α is in a range of zero to 70 degrees. In the line graph B, optical efficiency is not improved compared with the condition that the angle α is zero (0) degree that means flat and is shown as the sign D in FIG. 3.

However, the invention aims to obtain an improved luminous intensity ratio from the light-exit surface of the light-guiding region LR, and with a configuration disclosed herein, the luminous intensity ratio from the light-exit surface of the light-guiding region LR becomes improved.

FIG. 4 shows signs used herein with explanations in the specifications. The angle α is an inclination angle formed by a first surface 5a(6a) and the surface S. The first surface 5a(6a) is larger in area than the second surface 5b(6b). The length "T" is a length of a short edge of the mounting surface 2a of the substrate 2. The length "t" is a length of the light-emitting element 3 viewed from a direction of the short edge of the mounting surface 2a of the substrate. The length "t" is along the length "T" of the short edge of the mounting surface 2a of the substrate 2. The angle "θc" is an angle obtainable by a line connecting a lower edge of the light-emitting element 3 to the end of the region R at the first side 4a of the light-transmitting resin 4. The angle "θc" is also obtainable by a line connecting an upper edge of the light-emitting element 3 to the end of the region R at the second side 4b of the light-transmitting resin 4. The light-emitting element 3 here is positioned in a center of the alignment of the light-emitting elements 3. The lower edge of the light-emitting elements 3 is in parallel with the alignment of the light-emitting elements 3.

FIG. 4 shows signs used herein with explanations in the specifications. A region "R" is a region of a light-transmitting resin 4. The region R is adjacent to light-emitting elements 3 that are arranged on a mounting surface 2a of the substrate 2 to be an alignment on a center line CL between long edges 21 of the mounting surface 2a of the substrate 2. The alignment of the light-emitting elements 3 is positioned in the middle of a thickness of the light-transmitting resin 4 between the first side 4a and the second side 4b of the light-transmitting resin 4. The region R includes optical elements 5 at the first side 4a and optical elements 6 at the second side 4a of the light-transmitting resin 4.

It is suggested that a size of the region R in which the optical elements 3 at the first side 4a and the second side 4b of the light-transmitting resin 4 are arranged may be decided by a following formula:

$$R \le \left(\frac{T}{2} + \frac{t}{2}\right)\tan\theta c$$

in a condition that a thickness of the light-transmitting resin 4 at an end of the region R and the thickness that is a direction in parallel with a short edge of the mounting surface of the substrate is T; a width of the light-emitting element 3 and the width that is in parallel with the short edge of the mounting surface of the substrate is t; R is a region in which optical elements 5, 6 are arranged on the first side 4a, 40a and the second side 4b, 40b of the light-transmitting resin 4,40; and θc is an angle formed by a vertical surface V to the surface S that is perpendicular to the mounting surface 2a of the substrate 2 and a line L that connects a lower edge of light-emitting surface of the light-emitting element 3 and the end of the region R of the first side 4a, 40a of the light-transmitting resin 4,40. The thickness of the light-transmitting resin at an end of the region R is preferably to be the same thickness as a thickness of a starting end of the light-guiding region LR. The vertical surface V is an imaginary surface that is perpendicular to the surface S.

Each of the optical elements 5 at the first side 4a includes a first surface 5a and a second surface 5b that is smaller in area than the first surface 5a. The first surface 5a of the optical element 5 is inclined with an angle α that is in a range of one to 40 degrees with respect to a surface S that is perpendicular to the mounting surface 2a of the substrate 2 with an edge of the surface S in parallel with the center line CL between the two long edges 21 of the mounting surface 2a of the substrate 2.

Each of the optical elements 6 at the second side 4b includes a first surface 6a and a second surface 6b that is smaller in area than the first surface 6a. The first surface 6a of the optical element 6 is inclined with an angle α that is in a range of one to 40 degrees with respect to a surface S that is perpendicular to the mounting surface 2a of the substrate 2 with an edge of the surface S in parallel with the center line CL between the two long edges 21 of the mounting surface 2a of the substrate 2.

The optical elements 5 of the first side 4a and the optical elements 6 of the second side 4b are symmetrically arranged in the region R.

FIG. 5A shows a part of planar lighting device 300 according to a third embodiment of the present invention, showing optical elements 5 at a first side and optical elements 6 at a second side in a region R. A width W of the optical element 5(6) is constant, and a height H of the optical element 5(6) is constant. In this embodiment, the optical elements 5, 6 are arranged as protruding portions. The optical elements 5 of the first side 4a and the optical elements 6 of the second side 4b are symmetrically arranged in the region R.

FIG. 5B shows a part of planar lighting device 400 according to a fourth embodiment of the present invention, showing optical elements 5 at a first side and optical elements 6 at a second side in a region R. The lighting device 400 includes optical elements 5(6) in a region R. In this embodiment, the optical elements 5, 6 are arranged as grooves. A width W of the optical element 5(6) is constant, and a depth D1, D2, D3, D4, D5 of the optical element 5(6) are arranged to be shallower with an increasing distance from the mounting surface 2a of the substrate 2. The optical elements 5 of the first side 4a and the optical elements 6 of the second side 4b are symmetrically arranged in the region R.

The optical elements 5, 6 may be arranged as grooves in the first side 4a and second side 4b and may be arranged as protruding portions from the first side 4a and second side 4b.

FIG. 5C shows a part of planar lighting device 500 according to a fifth embodiment of the present invention, showing optical elements 5 at a first side and optical elements 6 at a second side in a region R. In this embodiment, the optical elements 5, 6 are arranged as grooves. A width W1, W2, W3, W4, W5 of the optical element 5(6) is arranged to be wider with an increasing distance from the mounting surface 2a of the substrate, and a depth D of the optical element 5(6) is constant.

The optical elements 5 at the first side 4a of the light-transmitting resin 4 include a first optical element 5' and a second optical element 5". The first optical element 5' of the optical elements 5 is positioned closer to the light-emitting elements 3 than the second optical element 5". The first optical element 5' of the optical elements 5 is smaller in width than the second optical element 5" of the optical elements 5.

The optical elements 6 at the second side 4b of the light-transmitting resin 4 include a first optical element 6' and a second optical element 6". The first optical element 6' of the optical elements is positioned closer to the light-emitting elements 3 than the second optical element 6". The first optical element 6' of the optical elements 6 is smaller in width than the second optical element 6" of the optical elements 6.

FIG. 5D shows a part of planar lighting device 600 according to a sixth embodiment of the present invention, showing optical elements 5 at a first side and optical elements 6 at a second side in a region R. The planar lighting device 600 includes optical elements 5(6) in a region R. In this embodiment, the second surface 5b(6b) of the optical element 5(6) is flat. The height H of the optical element 5(6) is constant, and the width w of the optical element 5(6) are arranged to be wider with an increasing distance from the mounting surface 2a of the substrate 2. The width of the optical element 5(6) is arranged to be wider, with an increasing distance from the light source 1.

FIG. 6A shows a part of planar lighting device 700 according to a seventh embodiment of the present invention, showing optical elements 5 at a first side and optical elements 6 at a second side in a region R. The planar lighting device 700 includes a first reflector 8 that is arranged over the region R at the first side 4a of the light-transmitting resin 4. The planar lighting device 700 may include a second reflector 9 that is arranged over the region R at the second side 4b of the light-transmitting resin 4. The second reflector 9 may be larger in area than the first reflector 8. The second reflector 9 may cover a whole surface of the second side 4b both in the region R and the light-guiding region. If the light-guiding region LR at the first side 4a includes a light-exit surface to emit light to illuminate an object, the first reflector 8 is not provided at the light-exit surface of the first side 4a of the light-guiding region LR to emit light to illuminate the object. The object may be a display arranged above the light-exit surface at the first side 4a of the light-transmitting resin 4. A reflector here may include a reflection sheet and a reflection coating. The reflector itself reflects light, but only with a reflector, light will be repeatedly reflected in the region R adjacent to the light-emitting elements with attenuation of light. Accordingly, optical elements 5, 6 at both the first side 4a and the second side 4b of the light-transmitting resin 4 in the region R are necessary for embodiments of the present invention to efficiently transmit light in the region R toward the light-guiding region LR that is adjacent to the light-guiding region LR and includes a light-exit surface. The reflector herein is used to prevent leakage of light at an unnecessary region.

FIG. 6B shows a part of planar lighting device 701 according to an eighth embodiment of the present invention showing optical elements 5 at a first side and optical elements 6 at a second side in a region R. The planar lighting device 701 may include a first reflector 8 that is arranged over the region R at the first side 4a of the light-transmitting resin 4, and a second reflector 9 that is arranged over the region R at the second side 4b of the light-transmitting resin 4. The difference between the planar lighting device 700 and the planar lighting device 701 is whether the region R and the light-guiding region LR are integrally formed by molding light-transmitting resin to be the planar lighting device 700 or separately prepared and adhered by an adhesive layer 7 as the planar lighting device 701.

FIG. 7 is a perspective view from above, of planar lighting device 800 according to a ninth embodiment of the present invention.

In this embodiment, the light-transmitting resin 40 in the region R is arranged as separated portions 40A, 40B, and 40C each including at least one light-emitting element 3. Each of the separated portions 40A, 40B and 40C includes a first side 40a and a second side 40b that is an opposite side of the first side 40a. The first side 40a of the separated portion 40A, 40B, 40C includes optical element 5 and the second side 40b of the separated portion 40A, 40B, 40C includes optical element 6 in a region R adjacent to the light-emitting element 3. The light-emitting elements 3 each includes a light-emitting surface 3a that is positioned in the light-transmitting resin 40 between the first side 40a and the second side 40b of the light-transmitting resin 40.

FIG. 8A shows a part of planar lighting device 900 according to a tenth embodiment of the present invention.

FIG. 8B is an enlarged view in a circle shown in FIG. 8A, showing optical elements 5 at a first side 4a of a light-transmitting resin 4.

Similarly to another embodiment, a planar light guide device 900 includes a light source 1 including a substrate 2, and light-emitting elements 3 that are electrically connected to the substrate 2. The light-emitting elements 3 are not shown in FIG. 8A and FIG. 8B to show the optical elements 5 at the first side of the light-transmitting resin 4. Similarly to another embodiment, the light-emitting elements 3 are arranged on a mounting surface 2a of the substrate 2 to be an alignment on a center line CL between two long edges 21 of the mounting surface 2a of the substrate 2. Except the explanation about the optical elements 5, 6 of this embodiment, explanations about the first embodiment can be referred to.

In this embodiment, the first side 4a of the light-transmitting resin 4 includes optical elements 5 that are arranged in a region R adjacent to the light-emitting elements 3, and each of the optical elements 5 includes a first surface 5a and a second surface 5b that is smaller in area than the first surface 5a.

The first surface 5a of the optical element 5 is inclined with an angle $\alpha$ that is in a range of one to 40 degrees with respect to a surface S that is perpendicular to the mounting surface 2a of the substrate 2. Regarding the relationship of the angle $\alpha$ and the surface S is referenced to the explanations with previous embodiments.

In this embodiment, the optical element 5(6) has a shape of four-sided pyramid with the first surface 5a(6a) larger in area than the second surface 5b(6b). The first surface 5a(6a) has a triangular shape, and the second surface 5b(6b) has a triangular shape, and the first surface 5a(6a) and the second surface 5b(6b) are in contact with each other at an apex of optical element 5(6) that has a shape of four-sided pyramid. The optical element 5(6) further includes a third surface 5c(6c) that has a triangular shape and a fourth surface 5d(6d) that has a triangular shape. The first surface 5a(6a), the second surface 5b(6b), the third surface 5c(6c) and the fourth surface 5d(6d) configure the apex of the optical element 5(6). Though reference numbers 6a-6d are not shown in FIG. 8A and FIG. 8B, the optical elements 5 at the first side 4a of the light-transmitting resin 4 and the optical elements 6 at the second side 4b of the light-transmitting resin 4 are symmetrically arranged in the region R. Therefore, the configuration of the second side 4b is able to be referenced to the configuration of the first side 4a and thus, a figure showing the configuration of the second side 4b is omitted.

The width of the optical element 5(6) is arranged to be wider, with an increasing distance from the light source 1.

The second side 4b of the light-transmitting resin 4 includes optical elements 6 that are arranged in a region R adjacent to the light-emitting elements 3, and each of the optical elements 6 includes a first surface 6a and a second surface 6b that is smaller in area than the first surface 6a.

The first surface 5a of the optical element 5 is inclined with an angle $\alpha$ that is in a range of one to 40 degrees with respect to a surface S that is an imaginary surface perpendicular to the mounting surface 2a of the substrate 2. In this embodiment, the optical element 6 has a shape of four-sided pyramid with the first surface 6a larger in area than the second surface 6b. The first surface 6a has a triangular shape, and the second surface 6b has a triangular shape, and the first surface 6a and the second surface 6b are in contact with each other at an apex of optical element 6 that has a shape of four-sided pyramid. The optical element 6 further includes a third surface 6c that has a triangular shape and a fourth surface 6d that has a triangular shape. The first surface 6a, the second surface 6b, the third surface 6c and the fourth surface 6d configure the apex of the optical element 6.

The light-transmitting resin 4 includes a light-guiding region LR adjacent to the region R in which the optical elements 5, 6 at the first side 4a and the second side 4b of the light-transmitting resin 4 are symmetrically arranged to each other.

In this embodiment, the region R including the optical elements 5, 6 and a light-guiding region LR are integrally arranged without an adhesive layer. However, it is of course possible that the light source 1 including the region R of light-transmitting resin with optical elements 5, 6 and the light-guiding region LR as a light guide plate are integrated with an adhesive layer, as previously explained in an another embodiment.

Furthermore, while certain embodiments of the present inventive subject matter have been illustrated with reference to specific combinations of elements, various other combinations may also be provided without departing from the teachings of the present inventive subject matter. Thus, the present inventive subject matter should not be construed as being limited to the particular exemplary embodiments described herein and illustrated in the Figures, but may also encompass combinations of elements of the various illustrated embodiments.

Many alterations and modifications may be made by those having ordinary skill in the art, given the benefit of the present disclosure, without departing from the spirit and scope of the inventive subject matter. Therefore, it must be understood that the illustrated embodiments have been set forth only for the purposes of example, and that it should not be taken as limiting the inventive subject matter as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the inventive subject matter.

What is claimed is:

1. A planar light guide device comprising:
a light source comprising a substrate, and light-emitting elements that are electrically connected to the substrate and are arranged on a mounting surface of the substrate to be an alignment on a center line between two long edges of the mounting surface of the substrate; and
a light-transmitting resin sealing the light-emitting elements and the mounting surface of the substrate, the light-transmitting resin comprising a first side and a second side that is an opposite side of the first side
wherein the light-emitting elements each comprises a light-emitting surface that is positioned in the light-transmitting resin between the first side and the second side of the light-transmitting resin,
the first side of the light-transmitting resin comprises optical elements that are arranged in a region adjacent to the light-emitting elements, and each of the optical elements comprises a first surface and a second surface that is smaller in area than the first surface, and the first surface of the optical element is inclined with an angle that is in a range of one to 40 degrees with respect to a surface that is perpendicular to the mounting surface of the substrate with an edge of the surface in parallel with the center line between the two long edges of the mounting surface of the substrate,
the second side of the light-transmitting resin comprises optical elements that are arranged in a region adjacent to the light-emitting elements, and each of the optical elements comprises a first surface and a second surface that is smaller in area than the first surface, and the first surface of the optical element is inclined with an angle that is in a range of one to 40 degrees with respect to a surface that is perpendicular to the mounting surface of the substrate with an edge of the surface in parallel with the center line between the two long edges of the mounting surface of the substrate.

2. The planar light guide device according to claim 1, wherein the light-transmitting resin comprises a light-guiding region adjacent to the region in that the optical elements of the first side and the optical elements of the second side are symmetrically arranged.

3. The planar light guide device according to claim 1, wherein at least one side of the first side and the second side of the light-guiding region of the light-transmitting resin comprises a light-exit surface to emit light.

4. The planar light guide device according to claim 1, wherein the region comprising the optical elements at the first side and the optical elements at the second side and the light-guiding region are adhered to each other through an adhesive layer.

5. The planar light guide device according to claim 4, wherein the light-guiding region comprises a light-guiding plate.

6. The planar light guide device according to claim 2, wherein the optical element of the first side of the light-transmitting resin is a groove, and
the optical element of the second side of the light-transmitting resin is a groove.

7. The planar light guide device according to claim 2, wherein the optical element of the first side of the light-transmitting resin is a protruding portion, and
the optical element of the second side of the light-transmitting resin is a protruding portion.

8. The planar light guide device according to claim 1, wherein the region in that the optical elements are arranged is shown as R is decided by an formula $$R \le \left(\frac{T}{2} + \frac{t}{2}\right)\tan\theta c$$

in a condition that a thickness of the light-transmitting resin at an end of the region R and the thickness that is a direction in parallel with a short edge of the mounting surface of the substrate is T, a width of the light-emitting element and the width that is in parallel with the short edge of the mounting surface of the substrate is t, R is the region in that the optical elements are arranged on the first side and the second side of the light-transmitting resin, and $\theta c$ is an angle formed by a vertical surface to the surface that is perpendicular to the mounting surface of the substrate and a line that connects a lower edge of light-emitting surface of the light-emitting element and the end of the region R of the first side of the light-transmitting resin.

9. The planar light guide device according to claim 1, wherein the optical elements at the first side of the light-transmitting resin comprise a first optical element and a second optical element, the first optical element of the optical elements at the first side of the light-transmitting resin is positioned closer to the light-emitting elements than the second optical element, and the first optical element of the optical elements is smaller in width than the second optical element of the optical elements.

10. The planar light guide device according to claim 9, wherein the optical elements at the second side of the light-transmitting resin comprise a first optical element and a second optical element, the first optical element of the optical elements at the second side of the light-transmitting resin is positioned closer to the light-emitting elements than the second optical element, and the first optical element of the optical elements is smaller in width than the second optical element of the optical elements.

11. The planar light guide device according to claim 9, wherein the width of the optical element in the region at the first side of the light-transmitting resin is configured to be wider, with an increasing distance from the light-emitting elements.

12. The planar light guide device according to claim 10, wherein the width of the optical element in the region at the second side of the light-transmitting resin is configured to be wider, with an increasing distance from the light-emitting elements.

13. The planar light guide device according to claim 9, wherein in the region at the first side of the light-transmitting resin, the first surface of the first optical element is smaller in area than the first surface of the second optical element.

14. The planar light guide device according to claim 10, wherein in the region at the second side of the light-transmitting region, the first surface of the first optical element is smaller in area than the first surface of the second optical element.

15. The planar light guide device according to claim 1, wherein the first surface of the optical element has a rectangular shape.

16. The planar light guide device according to claim 1, wherein the first surface of the optical element has a triangular shape.

17. The planar light guide device according to claim 7, wherein the optical element of the first side of the light-transmitting resin has a shape of four-sided pyramid with the first surface larger in area than the second surface, and the optical element of the second side of the light-transmitting resin has a shape of four-sided pyramid with the first surface larger in area than the second surface.

18. The planar light guide device according to claim 1, wherein the first surface of the optical element at the first side of the light-transmitting resin is inclined with an angle in a range of five to 20 degrees with respect to a surface that is perpendicular to the mounting surface of the substrate with an edge of the surface in parallel with the center line between the two long edges of the mounting surface of the substrate, and the first surface of the optical element at the second side of the light-transmitting resin is inclined with an angle in a range of five to 20 degrees with respect to a surface that is perpendicular to the mounting surface of the substrate with an edge of the surface in parallel with the center line between the two long edges of the mounting surface of the substrate.

* * * * *